United States Patent [19]

Bussiere et al.

[11] Patent Number: 4,680,180

[45] Date of Patent: Jul. 14, 1987

[54] LOW ALCOHOL BEER PREPARED WITH HYDROGENATED STARCH HYDROLYZATE

[75] Inventors: Guy Bussiere, La Gorgue; Marius Zimmermann, Hazebrouck; Michel Huchette, Merville, all of France

[73] Assignee: Roquette Freres, Lestrem, France

[21] Appl. No.: 608,445

[22] Filed: May 9, 1984

[30] Foreign Application Priority Data

May 11, 1983 [FR] France ............................. 83 07922

[51] Int. Cl.$^4$ ....................... C12C 11/04; C12C 9/00
[52] U.S. Cl. ...................................... 426/16; 426/29; 435/93
[58] Field of Search ............... 426/13, 16, 29; 435/93, 435/96, 98, 99

[56] References Cited

U.S. PATENT DOCUMENTS 3,849,194 11/1974 Armbruster et al. ................. 435/99
4,346,116 8/1982 Verwaerde et al. .................. 435/98

Primary Examiner—David M. Naff
Attorney, Agent, or Firm—Larson and Taylor

[57] ABSTRACT

Low alcohol beer is produced by a process wherein a portion of malt is replaced with a hydrogenated starch hydrolyzate. The hydrolyzate is preferably added before boiling of wort in the presence of hops in a amount to provide a final beer with 0.1 to 2% by weight hydrolyzate. The hydrolyzate has between 0.1 and 35% substances of DP 1, between 0.1 and 45% substance of DP 2, less than 45% substances greater than DP 20, and a remainder of substances of DP 3 to 20.

8 Claims, No Drawings

LOW ALCOHOL BEER PREPARED WITH HYDROGENATED STARCH HYDROLYZATE

The invention relates to a beer of the type which has low alcohol content with respect to the normal content of 2° to 4.6° and which is generally denoted by the expressions "alcohol-free beer", "low alcohol-content beer", "alcohol-reduced beer" or also by the English expression "light beer". It relates also to the process for manufacturing this type of beer.

The production of beers of the type concerned has experienced, in recent years, a considerable development particularly within the framework of the fight against drunkenness and alcoholism.

They are obtained in various ways of which the principal ones will be indicated below, after a brief review of the fundamental phases of the manufacture of beer; it will be seen that they all have considerable drawbacks.

The manufacture of beer comprises, basically, the mashing operation in which the raw materials, that is to say the malt and, in most countries, starchy materials, are hydrolyzed in an aqueous medium and under the influence of the enzymes of malt into simple sugars—essentially maltose—and into limit-dextrins, this mashing operation resulting, after separation of the solid materials, in a liquid called wort, the sterilizing treatment of the wort by boiling concomitantly with the addition of hops and, the fermentation of the wort under the influence of beer yeast manifested by the metabolization of the simple sugars with formation of alcohol, carbon dioxide and aromatic substances.

Consequently, the alcoholic degree of the beer obtained depends on the proportion of fermentable sugars in the wort subjected to fermentation and on the degree of metabolization of the sugars.

To lower this alcohol degree, recourse has been had to the evaporation of the alcohol, the beer being subjected to a high vacuum inside an evaporator. This process is expensive since it introduces an additional operation and it gives beers which are scarcely pleasant to the taste since they are unbalanced due to the fact of the removal of volatile aromatic substances.

Attempts have also been made to reduce in various ways the percentage of fermentable sugars in the wort.

In this connection, it has been proposed to modify the conditions of hydrolysis of the malt and of the starchy substances by replacing the action of the enzymes of the malt after inhibition of the said enzymes by a mixture of amylasic enzymes selected so that it leads to a limitation in the production of simple sugars.

It has also been proposed to stop the hydrolysis simply before its normal termination.

Still in this connection, it has been proposed to dilute the wort, before subjecting it to fermentation, with syrups of glucose or of malto-dextrins selected for their low content of fermentable simple sugars.

In the three cases, the presence of a large proportion of polysaccharides results in the so-treated beer giving a doughy impression to the taste.

In another order of ideas, it has been contemplated to stop the fermentation, for example by sudden cooling, so that only a portion of the fermentable sugars is metabolized; the drawback of this process is that subsequent restarting of fermentation can never be positively excluded.

Serious improvements have been achieved by replacing a portion of the malt with sorbitol.

The results recorded are not however entirely satisfactory by reason particularly of the sweet taste conferred on the beer and which is not always desired.

As can be seen, none of the solutions proposed by the prior art is satisfactory in all respects.

It is therefore a particular object of the invention to overcome the drawbacks of the prior art and to provide a beer with a low alcohol content giving satisfaction to the consumer.

Applicant Company has found that this object is achieved when the beer contains a hydrogenated starch hydrolysate whose composition (expressed as a percentage by weight on the dry matter) is as follows:

content of substances of DP 1 (degree of polymerisation) comprised between 0.1 and 35%, preferably between 0.1 and 20%, content of substances of DP 2 comprised between 0.1 and 45%, preferably between 0.1 and 42%, content of products of DP>20 less than 45%, preferably less than 40% and, more preferably still, less than 30%, the complement to 100 being constituted by substances of DP 3 to 20.

It follows that the low alcohol content beer according to the invention is characterized by the fact that it comprises a proportion of 0.1 to 2% by weight of the abovesaid hydrogenated starch hydrolysate.

The manufacturing process of the beer with reduced alcohol content according to the invention is characterized by the fact that at any moment of the manufacture of the beer and, preferably, at the latest, at the moment of the fermentation operation and advantageously before or during the sterilization treatment of the wort by boiling in the presence of hops, the abovesaid hydrogenated starch hydrolysate is added in an amount such that the final beer contains thereof a proportion of 0.1 to 2% by weight.

The hydrolysate is introduced preferably in the form of a syrup of 6 to 85% by weight of dry matter; the use of the hydrolysate in the form of powder is also possible.

The hydrogenated starch hydrolysates used within the scope of the present invention can be obtained by hydrogenation of the starch hydrolysates having a DE comprised between 15 and 55, preferably between 15 and 50.

They have preferably, in addition, contents of substances of DP 1 and DP 2 whose sum is less than 60%, so that the beer obtained does not have too pronounced a sweet taste (the sweet taste being principally contributed by the sorbitol and especially the maltitol) and that it has a sufficient "body" and mellowness.

Particularly preferred hydrogenated starch hydrolysates within the scope of the invention, since they enable the resulting alcohol-free beers to have a pleasant taste, having a sufficient "body" without however giving a "doughy" impression on tasting, are those corresponding to the following glucidic spectrum:

0.5% < substances of DP 1 < 16%

1% < substances of DP 2 < 35%

0% ≦ substances of DP > 20 < 20%.

One of the inherent advantages of the invention is however is to be able to modify without changing the basic parameters of a given beer manufacturing process, the sweet flavor and "body" and the mellowness of the final product, by varying, within the indicated general limits, the composition of the hydrolysate used, which is made possible by various acid or acid-enzyme or enzyme-enzyme hydrolysis techniques of the starch.

To illustrate the preceding indications, there are given below a certain number of examples comprising advantageous embodiments of the invention.

EXAMPLE 1

A low alcohol content beer is prepared by the incorporation, in an amount representing 20% of the total dry extract (essentially malt), of a hydrogenated starch hydrolysate A whose composition is as follows:

| Substances of DP 1 | 12% |
|---|---|
| Substances of DP 2 | 9% |
| Substances of DP 3 | 12% |
| Substances of DP > 20 | 6% | the DE (dextrose-equivalent) of this hydrolysate before hydrogenation having been 34.

To obtain 100 g of wort, 6 g of initial dry matter are necessary and therefore 4.8 g of dry extract of malt and 1.2 g of dry extract of hydrogenated starch hydrolysate A are used.

This beer is compared with those coming from two control tests; the first control is constituted by a beer prepared under the same conditions as the preceding one without however 20% of the total dry extract being replaced by hydrolysate A; the second control was a beer also prepared under the same conditions but in which the amount of the total dry extract was reduced by 20% without compensation by an equivalent amount of hydrolysate.

Below are indicated the steps in the manufacture of the first control, that is to say of the "pure malt" beer:

Step 1—This is the mashing step. A mixture of 210 g of malt and 850 ml of water was heated respecting the follow temperature program: 30 minutes at 50° C., 30 minutes at 68° C., 30 minutes at 75° C.

All the rises in temperature were made at the speed of 1° C./minute.

Step 2—This is a filtration step, carried out on filter paper.

Step 3—This is a washing step. The draff was washed twice with 500 ml of hot water at 70°–75° C.

Step 4—This step consists of the dilution of the wort with water to obtain 3 liters of solution.

Step 5—This is the sterilization step in the presence of hops. The wort is taken to boiling for 1 hour 30 minutes, the hopping operation consisting of adding 0.6 g of hops (in the form of concentrated granules) per liter of wort after 30 minutes boiling.

Step 6—This is a step of fast cooling (under running water) and succinct filtration of the wort on cotton to retain the particles of hops and coarse cloudiness.

Step 7—In the course of this step, the wort is seeded by means of 4 g of doughy yeast per liter of wort.

Step 8—This is the fermentation step which comprises two stages of which the first consists of holding the temperature at 8° C. for 6 to 8 days and of which the second consists of transferring the medium into hermetic flasks and keeping the temperature at 0° C. for 8 to 10 days.

Finally about 2.6 liters of beer are obtained.

The manufacture of the second control proceeds in the same manner, with the difference that the amount of malt is reduced by 20% and that it is not compensated subsequently by an addition of hydrogenated starch hydrolysate.

The preparation of the lower alcohol content beer according to the invention proceeds, in the case of an advantageous embodiment, also in the same manner, with the difference that 20% of the malt is replaced by an equivalent amount of hydrogenated starch hydrolysate A.

From the practical point of view, recourse is therefore had, in Step 1, to an amount of malt reduced by 20%, that is to say limited to 168 g.

Twenty minutes before the end of the boiling in Step 5, 42 g of hydrolysate A are added. With respect to the finished product, therefore about 1.6% by weight of a hydrogenated starch hydrolysate A is introduced, expressed with respect to the beer.

The results recorded for the three beers so manufactured are indicated below.

The beer constituted by the first control has an alcohol degree of 2.3°, hence distinctly higher than the value aimed at which was 1.8°. In addition, this beer is judged by the tasters as being flat and without body.

The beer constituted by the second control has an alcohol degree close to 1.8, but the tasters did not judge that this drink could be qualified as beer.

The beer according to the invention (20% of total dry extract of the wort constituted by hydrolysate A) has an alcohol degree of 1.85 which is hence very close to the value aimed at; it has a quite normal appearance. It has however a carbon dioxide content which is somewhat low, in direct relationship with the very low level of fermentables (used in the preparation) and which can be corrected easily by the addition of carbon dioxide in the course of the industrial process. This beer was judged very satisfactory from the point of view of its taste properties.

EXAMPLE 2

Procedure was identical with that indicated in Example 1 for the preparation of the beer according to the invention, with the exception that the hydrogenated hydrolysate A was replaced by the same amount in dry matter of a maltodextrin whose composition was as follows:

| Substances of DP 1 | 1.5% |
|---|---|
| Substances of DP 2 | 5% |
| Substances of DP 3 | 6.5% |
| Substances of DP > 20 | 42.5% | the DE of this malto-dextrin being 16.

The beer produced was slightly more colored than that of the first example using hydrogenated starch hydrolysate A. It possesses a more marked taste, defineable with difficulty and had a scarcely pleasant bitterness, different from that due to hops; finally, it gave to the taste and especially on swallowing a "thick or doughy" impression. Its alcohol content was 1.91°.

This example shows well that even malto-dextrins having a fermentable ratio less than or equal to 6.5% do not procure comparable results to those which it is possible to obtain with the hydrogenated starch hydrolysates employed according to the invention.

EXAMPLE 3

The taste properties of different beers obtained by the direct incorporation of a certain number of hydrogenated starch hydrolysates in an "alcohol-free beer" sold under the trademark "CELTA-BIRELL®", manufactured in France by the S.A.E.D.G., were compared.

The hydrogenated products were introduced in an amount contributing 1.2 g of dry extract per 100 ml of beer (except in the case where the proportion was lower), which gave a proportion of hydrolysate in the finished beer quite comparable with that obtained after the sterilization step of Example 1 in the manufacture of the beer according to the invention (malt+20% of hydrolysate A).

Five tests followed using different hydrogenated starch hydrolysates.

For each of the tests, the hydrolysate used is identified by its composition.

Test 1: Employment, as control, of a sorbitol syrup of composition:

| | |
|---|---|
| Substances of DP 1 | 84% |
| Substances of DP 2 | 10.5% |
| Substances of DP 3 | 3% |
| Substances of DP > 20 | 0. | the DE of this hydrolysate before hydrogenation having been 90.

Test 2: Employment of hydrolysate A of Example 1.

Test 3: Employment of hydrolysate A of Example 1 introduced at the level of 0.8 g of dry extract per 100 ml of beer.

Test 4: Employment of hydrogenated starch hydrolysate C of composition:

| | |
|---|---|
| Substances of DP 1 | 7.0% |
| Substances of DP 2 | 52.5% |
| Substances of DP 3 | 18.0% |
| Substances of DP > 20 | 1.0%, | the DE of this hydrolysate before hydrogenation having been 50.

Test 5: Employment of hydrogenated starch hydrolysate B of composition:

| | |
|---|---|
| Substances of DP 1 | 6.5% |
| Substances of DP 2 | 26.0% |
| Substances of DP 3 | 20.0% |
| Substances of DP > 20 | 7.5%, | the DE of this hydrolysate before hydrogenation having been 33.

Test 6: Employment of hydrogenated starch hydrolysate D of composition:

| | |
|---|---|
| Substances of DP 1 | 2% |
| Substances of DP 2 | 5% |
| Substances of DP 3 | 7% |
| Substances of DP > 20 | 37%, | the DE of this hydrolysate before hydrogenation having been about 21.

The beers obtained were tested and classified from the point of view of mellowness with respect to the sorbitol beer (Test 1) serving as a control by a tasting panel.

The beers of Tests 2, 4, 5 and 6 were found more mellow than the sorbitol beer. The hydrogenated starch hydrolysates used in Tests 2, 5 and 6 were judged as more successful, slight advantage being given by certain tasters to the beer of Test No. 2.

The hydrolysate used in Test No. 4 was classed between that of Test No. 5 and that of Test No. 1.

The beer of Test No. 3 was considered by the majority of tasters as being still at least equivalent to the control test beer although the amount of substance added was reduced by a third, which constitutes another advantage in favor of the hydrogenated hydrolysates used in accordance with the invention.

We claim:

1. In a process for manufacturing a low alcohol-content beer comprising the successive steps of
   mashing consisting in heating a mixture of malt and water,
   filtering of the resulting product obtained by mashing to provide draff and a wort,
   washing of the draff,
   diluting of the wort,
   sterilizing of the wort by boiling in the presence of hops,
   cooling and filtering of the wort,
   seeding of the wort with yeast,
   fermenting of the yeast-containing wort to produce beer,
the improvement comprising replacing, before the sterilization of the wort by boiling in the presence of hops, a proportion of the malt by an equivalent amount of a hydrogenated starch hydrolysate whose composition on dry matter is as follows:
   content of substances of DP 1 (degree of polymerisation) between 0.1 and 35%,
   content of substances of DP 2 between 0.1 and 45%,
   content of products of DP>20 less than 45%,
   the remainder of content being up to 100% with substances of DP 3 to 20,
the amount of hydrogenated starch hydrolysate being selected such that the final beer is provided with 0.1 to 2% by weight of the said hydrogenated hydrolysate.

2. Process according to claim 1, wherein the composition of the hydrogenated starch hydrolysate on dry matter is as follows:
   content of substances of DP 1 (degree of polymerisation) between 0.1 and 20%,
   content of substances of DP 2 between 0.1 and 42%,
   content of products of DP>20 less than 40%,
   the remainder of content being up to 100 with substances of DP 3 to 20.

3. Process according to claim 1, wherein the composition of the hydrogenated starch hydrolysate on dry matter is as follows:
   content of substances of DP 1 (degree of polymerisation) between 0.1 and 20%,
   content of substances of DP 2 between 0.1 and 42%,
   content of products of DP>20 less than 30%,
   the remainder of content being up to 100 with substances of DP 3 to 20.

4. Process according to claim 1, wherein the hydrogenated starch hydrolysate is in the form of a syrup of 6 to 85% by weight of dry matter.

5. Process according to claim 1, wherein the hydrogenated starch hydrolysate is in the form of a powder.

6. Low alcohol-content beer prepared by the process according to claim 1.

7. Low alcohol-content beer prepared by the process according to claim 2.

8. Low alcohol-content beer prepared by the process according to claim 3.

* * * * *